(12) United States Patent
Rósen et al.

(10) Patent No.: US 6,196,165 B1
(45) Date of Patent: Mar. 6, 2001

(54) DEVICE FOR SUPPLYING VAPOR TO THE INTAKE AIR OF AN INTERNAL COMBUSTION ENGINE

(75) Inventors: Per Rósen; Lars-Ola Olsson, both of Lund (SE)

(73) Assignee: Munters Euroform GmbH, Aachen (DE)

( * ) Notice: Subject to any disclaimer, the term of this patent is extended or adjusted under 35 U.S.C. 154(b) by 0 days.

(21) Appl. No.: 09/190,989

(22) Filed: Nov. 12, 1998

(51) Int. Cl.⁷ ....................................... F02B 47/00
(52) U.S. Cl. ........................................... 123/25 B
(58) Field of Search .................. 123/25 R, 25 A, 123/25 B

(56) References Cited

U.S. PATENT DOCUMENTS

| | | |
|---|---|---|
| 4,306,519 | * 12/1981 | Schoenhard ............ 123/25 A |
| 5,758,606 | * 6/1998 | Rosen et al. ............ 123/25 B |

* cited by examiner

Primary Examiner—Noah P. Kamen
(74) Attorney, Agent, or Firm—Herbert Dubno

(57) ABSTRACT

A device for supplying vapor to the intake air which is supplied to an internal combustion engine is described. The device has a moistening means which is formed as horizontal container which is flown through by the intake air and by a liquid to be evaporated in cross flow and/or parallel flow. The device has an especially flat construction due to the design of the moistening means as horizontal container. The cross flow and/or parallel flow principle in the moistening means assures a good efficiency with respect to the generation of vapor.

3 Claims, 3 Drawing Sheets

DEVICE FOR SUPPLYING VAPOR TO THE INTAKE AIR OF AN INTERNAL COMBUSTION ENGINE

FIELD OF THE INVENTION

The present invention is directed to a device for supplying vapor to the intake air that is supplied to an internal. The device comprising a moistening means which has a first connection for feeding liquid into the moistening means and a second connection for feeding the intake air into the moistening means. The moistening means supplies vapor to the intake air by contacting the intake air and the liquid with each other, while the same flow through said moistening means. A preheater is connected to the first connection of the moistening means and preheats the liquid before feeding it into the moistening means. A compressor provided for compressing the intake air which is connected to the second connection of said moistening means.

Such a device is known from WO 95/23286. By the supply of vapor to the intake air the level of the emissions of nitric oxide is drastically reduced and simultaneously the degree of utilization of the fuel is increased. By direct evaporation of the liquid in the obtained intake air it is possible to obtain, as a specific advantage, a self-regulation of the amount of vapor in the intake air so that thus no separate regulation of the amount of air in the intake air is necessary.

According to the known device the preheater is connected either to the cooling water or to the exhaust gases of the internal combustion engine in order to transfer the energy present in the cooling water or in the exhaust gases to the liquid.

As a regards the design of the moistening means in the known device, this is formed as moistening tower which is flown through by the intake air and the liquid in opposite directions, i.e. in counterflow, wherein the liquid is introduced at the upper end and the intake air is introduced at the lower end of the moistening tower. In the moistening tower the liquid is dispersed to a mist by a nozzle, wherein the mist falls down through the moistening tower and flows thereby through the compressed and thus heated intake air flowing upwardly through the moistening tower. A part of the moisture is evaporated and accompanies the intake air out of the moistening tower into the combustion chamber of the internal combustion engine, for instance a diesel engine with a turbo-supercharger.

The evaporation of the liquid in a gas mixture in this manner has the advantage that it occurs at substantially lower temperatures than in a case according to which only water is present. If a strong evaporation occurs at a relatively low temperature it becomes possible to use low-grade energy for the evaporation process which, for instance, can stem from the cooling water and/or the exhaust gases of the internal combustion engine. As mentioned above, with the known device the moistening means is designed as moistening tower, i.e. upright container. This construction of the moistening means is especially suitable for the feeding of the intake air and of the liquid in counterflow. However, such a construction of the moistening means sometimes can produce space problems, especially with close conditions, as for instance on ships.

OBJECT OF THE INVENTION

The object of the invention is to provide a device of the cited kind which has an especially compact structure with regard to its height dimensions.

SUMMARY OF THE INVENTION

According to the invention this object is attained with a device of the cited kind by the features that the moistening means is formed as lying container and is traversed through by the intake air and the liquid in cross flow and/or parallel flow.

The above-mentioned space problems are removed by the lying or horizontal construction of the moistening means. According to the invention it was ascertained that such a horizontal construction is suited for a counterflow conduction of liquid and intake air only in a limited manner since by this a relative bad efficiency with regard to the evaporation of vapor results. This is understandable since, according to a horizontal construction with a conduction in counterflow, the liquid is conducted parallel to the longitudinal axis of the horizontal container but drops relatively fast to the bottom of the container by gravity so that only a short contact length between liquid and intake air is present. In order to avoid this relative low efficiency with regard to the evaporation of vapour the inventive solution furthermore suggests that the horizontal container is flown through by the intake air and by the liquid in cross flow and/or parallel flow.

The term "lying or horizontal container" which is used here is to include also slightly inclined container positions extending to a position of 45° with respect to a horizontal line.

With "cross flow" it is meant that liquid and intake air impinges upon one another with an angle which preferably is 90°, however, can also deviate herefrom and can be, for instance, in a range between 45° and 135° with regard to the flow direction of the intake air if it is emanated from a horizontal passage of the container. Of course, the flow direction of the intake air can also slightly deviate from the horizontal direction.

With "parallel flow" it is meant that the intake air and liquid flow through the container substantially parallel with respect to one another wherein also in this case deviations from parallelism are possible, for instance, up to an angle of 45° with regard to the flow direction of the intake air.

If an ideal cross flow is present, i.e. if the liquid is introduced into the container at the upper side thereof and flows through the container horizontally, the contact length between the two media corresponds to the height of the container at maximum. However, the liquid is entrained in longitudinal direction of the container by the intake air laterally impinging on the introduced liquid so that the real contact length is longer. By this, a relatively good efficiency is achieved.

With parallel flow according to which liquid and intake air are conducted through the horizontal container in the same direction parallel with respect to one another the problems occuring with a counterflow conduction do not result since the introduced liquid is entrained by the intake air and is carried along over the length of the container so that also in this case a relative long contact length results which brings along a good efficiency.

However, in both cases a space-saving construction with regard to the height of the device is obtained without having to accept a degradation of the efficiency of the formation of vapour compared with the prior art.

According to an improvement of the invention, the moistening means has at least one nozzle for distributing the liquid in the container which is connected to the first connection. Dependent on the conduction of flow (cross flow or parallel flow) this nozzle is arranged in the upper portion or in the front portion (entrance portion) of the horizontal container. By means of the nozzle the liquid is atomized for the formation of a mist which falls down, contacts the intake air and is collected at the bottom of the moistening means. From here it can be fed back by a conduit to a liquid tank from which the liquid is also withdrawn.

Since the container with its horizontal construction practically has a relative great length it is especially favorable to arrange a plurality of nozzles in the upper portion of the container one behind the other in flow direction of the intake air when the liquid is conducted in cross flow so that the intake air on its way through the container receives always new liquid in corresponding portions of the container. In this manner an especially large portion of the liquid can be evaporated.

Another preferred solution of the invention consists in the feature that the moistening means includes at least one packing block. By this feature the moistening effect can be increased further. Suitable packing materials are known and have not to be described in detail at this point.

Practically, a plurality of packing blocks are disposed one behind the other in air flow direction in the container. If the flow is conducted in cross flow each packing block can be applied with a corresponding liquid mist from above by means of an associated nozzle. These packing blocks located one behind the other are horizontally flown through by the intake air wherein in each packing block portion a corresponding evaporation of the liquid takes place. With this embodiment additional control facilities result since, if desired, certain packing blocks can be operated with smaller output or can be totally shut down.

The container can be selectively provided with a droplet separator, practically in the downstream portion of the container and behind the packing blocks, if such are present.

The used liquid is preferably water so that water vapor is fed to the intake air of the internal combustion engine. Of course, instead of water any other desired and suitable liquid can be evaporated. The nozzle dispersing the liquid can be replaced, for instance, by equipment over which or through which, dependent on the embodiment, the liquid flows to the bottom of the moistening means.

Moreover, with regard to further details of the device it is pointed to the above-cited WO 95/23286 the disclosure of which is incorporated into the present application by reference.

BRIEF DESCRIPTION OF THE DRAWING

In the following the invention is described in detail by means of examples in connection with the drawing. In the drawing

SPECIFIC DESCRIPTION

Figure 1:
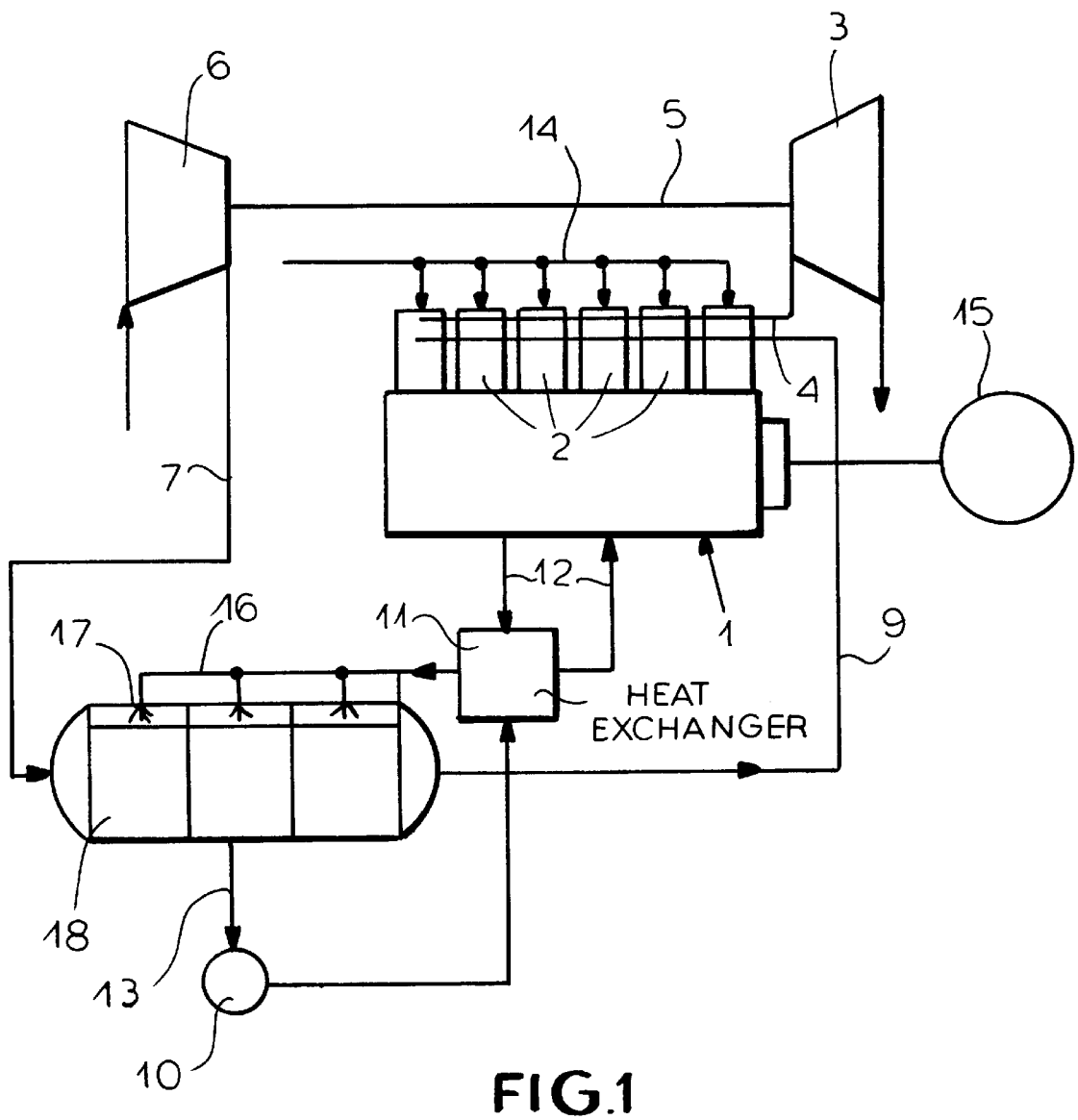
FIG. 1 shows a schematic representation of an internal combustion engine with a device for supplying vapor to the intake air which is connected therewith according to a first embodiment of the invention.

FIG. 1 shows an internal combustion engine 1 with six cylinders 2. The engine is a turbo-charged diesel engine. The turbo-charger comprises a turbine 3 which is connected to the exhaust gas side of the engine 1 via an exhaust gas conduct 4. The turbine is, via a shaft 5, connected to a compressor 6 for compressing the air supplied to the engine 1 on the intake side thereof via a first air conduit 7. Between the compressor 6 and the engine 1 a moistening means 8 is arranged which serves for supplying water vapor to the intake air before the same is supplied to the engine by means of a second air conduit 9. The water vapor is produced from water supplied from a tank 10 via a heat exchanger 11 to the moistening means 8. In the heat exchanger 11 the water is heated by the engine cooling water which circulates past the heat exchanger 11 via a conduit 12.

Now, the design of the moistening means 8 is described. The same is designed as lying or horizontal container. The container is divided into three compartments in the direction of its longitudinal axis which compartments each contain a packing block 18. Accordingly, in the flow direction of the inlet air, i.e. in FIG. 1 from left to right, three packing blocks 18 are disposed one behind the other.

In the left end portion of the container according to FIG. 1 a connection for the intake air conduct 7 coming from the compressor 6 is located. Compressed and heated intake air is introduced into the container by means of this connection so that the intake air flows through the container about horizontally and parallel with respect to the longitudinal axis of the container.

Three connections for the water conduit 16 coming from the heat exchanger 11 are located in the upper portion of the container. These connections lead to three nozzles 17 wherein each nozzle 17 is located above one packing block 18, respectively. The supplied water is distributed to a mist by means of the nozzles 17. The mist flows over the corresponding packing block 18 and contacts the intake air horizontally flowing through the packing block. By this, a part of the water mist is evaporated and entrained with the intake air which reaches the conduit 9 with which the intake air provided with vapor is supplied to the internal combustion engine through an outlet located at the right end portion of the container according to FIG. 1.

The part of the water which was not evaporated is collected at the bottom of the container and is withdrawn therefrom to a tank 10 by means of a conduit 13. From this tank the water is supplied to the heat exchanger 11.

Accordingly, heated water and heated and compressed intake air impinge upon one another in cross flow.

The device operates in the following manner:

The intake air is compressed in the compressor 6 which is driven through the shaft 5 by means of the turbine 3 which is driven by the exhaust gases of the engine 1. The compressed and thus heated intake air is introduced into the moistening means 8 in FIG. 1 from the left side and flows through the same in horizontal direction. By doing this it passes through the provided packing blocks 18 and is directed over the water collected at the bottom of the moistening means 8. Water is taken from the tank 10 and is fed through the heat exchanger 11 into the upper portion of the moistening means 8 where it is sprayed onto the packing blocks 18 by means of the three nozzles 17. While the water falls down through the packing blocks 18 it flows through the intake air horizontally flowing through the packing blocks. A part of the water is evaporated and accompanies the intake air out of the moistening means 8 into the combustion chamber of the engine 1. Accordingly, compared with the flow of water which is evaporated a significantly greater flow of water is supplied to the moistening means. Consequently, the evaporation energy is taken from the actual water. When the evaporation of the water is effected in this manner in a gas mixture, the evaporation occurs at considerably lower temperatures than in case of only water being present. This implies that the evaporation close to the point where the air is supplied to the moistening means 8 occurs at a very low temperature and increases through the moistening means 8 in the flow direction of the intake air with increasing moisture content and thus increasing partial pressure. When a powerful evaporation occurs at a relatively low temperature, it becomes possible to use low-grade energy for the evaporation process. Such low-grade energy is obtained in great amounts as excess heat from the engine 1 in the cooling water or exhaust gases. Accordingly, the cooling water, the exhaust gases or both can be used for preheating water before it is supplied to the moistening means 8.

It is to be still mentioned that fuel is supplied to the engine 1 by means of a fuel line 14. Furthermore, the engine is connected to a generator 15.

Figure 2:
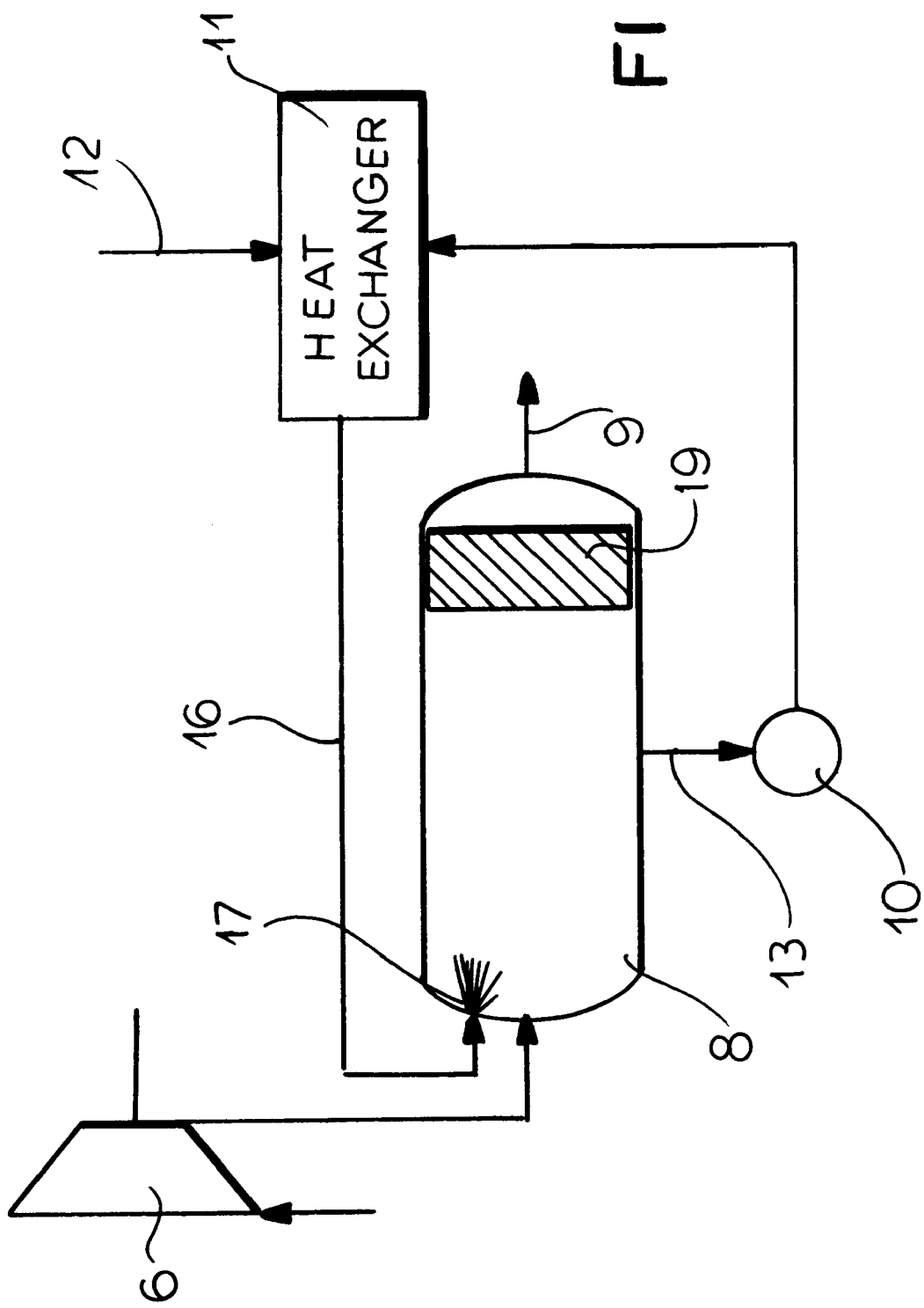
FIG. 2 shows the moistening means of a device for supplying vapor to the intake air of the internal combustion engine according to a second embodiment of the present invention; and, FIG. 3 shows the moistening means of a third embodiment.

FIG. 2 shows another embodiment of the inventive device which differs from the device of FIG. 1 only by a differently designed moistening means 8. Accordingly, in FIG. 2 only the part of the whole device is shown that concerns the moistening means 8.

With the embodiment of FIG. 2 the moistening means 8 is designed as horizontal container, too. According to this embodiment the container of the moistening means 8 is flown through by the compressed and heated intake air and by the water in parallel flow. As FIG. 2 shows, both media are introduced into the container in FIG. 2 at the left end portion thereof. The water heated through the heat exchanger 11 is supplied by means of the line 16 and arrives at a nozzle 17 arranged in the portion of the container end wall by means of a connection. In the nozzle the water is dispersed as spray mist. This spray mist falls down, however, is entrained by the inflowing intake air. Through the contact of both media a part of the water is evaporated and flows together with the intake air through a droplet separator 19 which is disposed on the downstream side in the container. The droplets entrained in the air flow and not evaporated or separated by this droplet separator, are collected in the lower part of the droplet separator and are supplied together with the water not evaporated in the remaining part of the container into a water tank 10 by means of a drain line 13. The water supplied through the heat exchanger 11 is taken from this water tank 10. The intake air entraining the water vapor is drained from the container by means of the line 9 and is supplied to the combustion engine.

Figure 3:
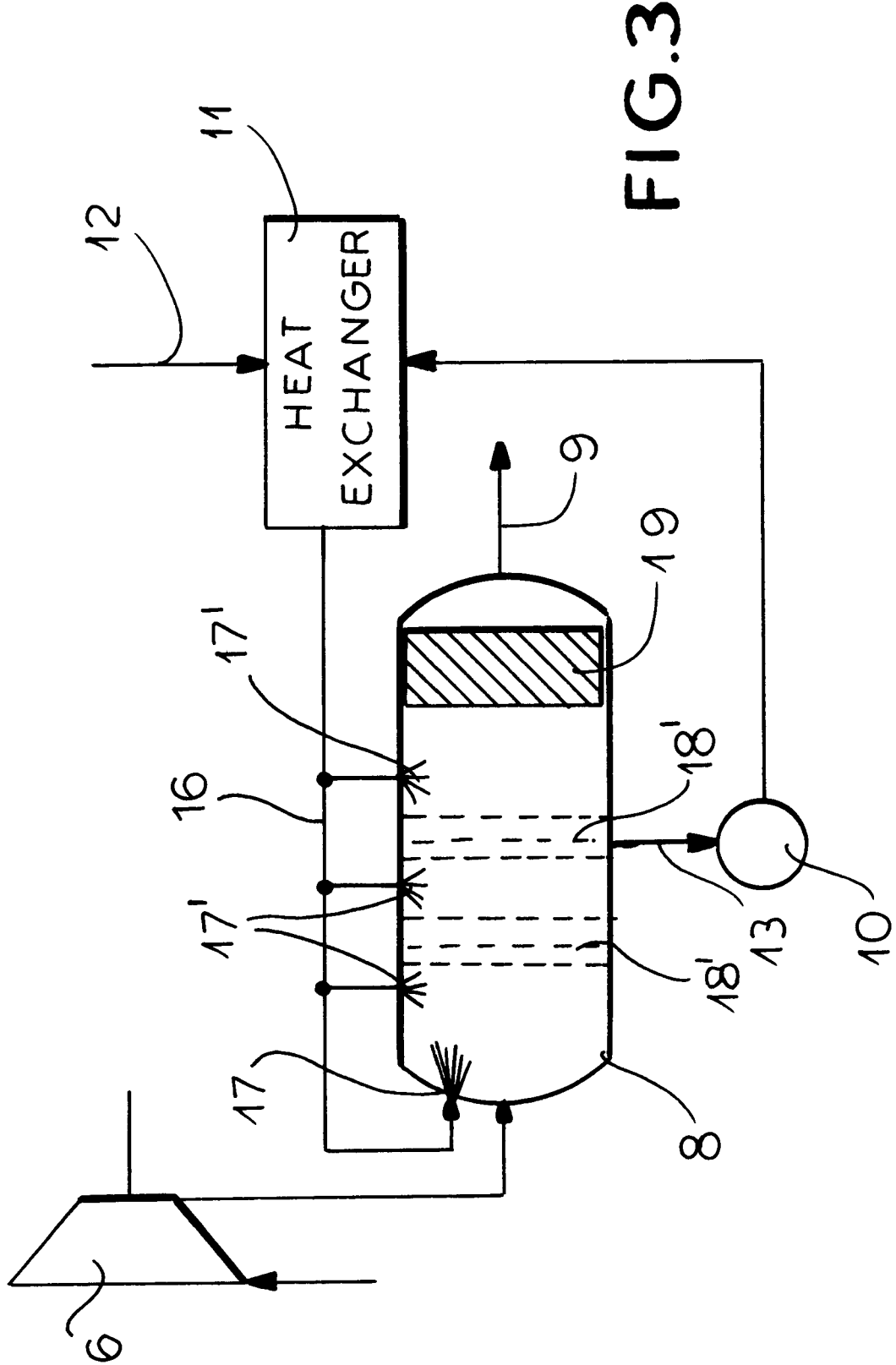

FIG. 3 shows the embodiment of FIG. 2 additionally provided with nozzles 17' as in FIG. 1 so that the device operates in both parallel and cross flow. The nozzles 17' alternate with the packing blocks 18'.

What is claimed is:

1. A device for supplying vapor to intake air which is supplied to an internal combustion engine and comprising, in combination with the internal combustion engine:

a moistening means having a first connection for feeding liquid into said moistening means, a second connection for feeding said intake air into said moistening means and a third connection connected to said engine for supplying moistened intake air to said engine, said moistening means being formed as a generally horizontal elongated container and said connections being provided so that said intake air and said liquid traverses said moistening means in cross flow, in parallel flow or in a combination of cross flow and parallel flow;

a preheater connected to said first connection for preheating the liquid before said liquid enters said container; and a compressor connected to the second connection for compressing intake air before said intake air enters said container, said first connection including nozzles spaced apart along said container and located alternatingly with packing blocks in said container.

2. A device for supplying vapor to intake air which is supplied to an internal combustion engine and comprising, in combination with the internal combustion engine:

a moistening means having a first connection for feeding liquid into said moistening means, a second connection for feeding said intake air into said moistening means and a third connection connected to said engine for supplying moistened intake air to said engine, said moistening means being formed as a generally horizontal elongated container and said connections being provided so that said intake air and said liquid traverses said moistening means in cross flow, in parallel flow or in a combination of cross flow and parallel flow;

a preheater connected to said first connection for preheating the liquid before said liquid enters said container; and a compressor connected to the second connection for compressing intake air before said intake air enters said container, said container having a plurality of packing blocks separately mounted one behind the other in said container and separately supplied with said liquid from above.

3. A device for supplying vapor to intake air which is supplied to an internal combustion engine and comprising, in combination with the internal combustion engine:

a moistening means having a first connection for feeding liquid into said moistening means, a second connection for feeding said intake air into said moistening means and a third connection connected to said engine for supplying moistened intake air to said engine, said moistening means being formed as a generally horizontal elongated container and said connections being provided so that said intake air and said liquid traverses said moistening means in cross flow, in parallel flow or in a combination of cross flow and parallel flow;

a preheater connected to said first connection for preheating the liquid before said liquid enters said container;

a compressor connected to the second connection for compressing intake air before said intake air enters said container, said first connection including nozzles spaced apart along said container and located alternatingly with packing blocks in said container; and a droplet separator in said container upstream of said third connection.

\* \* \* \* \*